(12) United States Patent  (10) Patent No.: US 8,760,864 B2
Chiang  (45) Date of Patent: Jun. 24, 2014

(54) HEAT-DISSIPATION STRUCTURE FOR A PORTABLE FOLDING ELECTRONIC APPARATUS

(75) Inventor: Ho-Hsing Chiang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 221 days.

(21) Appl. No.: 13/459,244

(22) Filed: Apr. 29, 2012

(65) Prior Publication Data

US 2013/0021806 A1    Jan. 24, 2013

(30) Foreign Application Priority Data

Jul. 18, 2011    (TW) .............................. 100125276 A (51) Int. Cl.
    *H05K 7/20*    (2006.01)
(52) U.S. Cl.
    USPC ............ 361/679.52; 361/679.26; 361/679.27; 361/679.46; 361/679.55; 165/104.14; 165/104.33; 165/185
(58) Field of Classification Search
    USPC ............ 361/679.02, 679.26, 679.27, 679.47, 361/679.52, 688, 689, 700, 701, 707; 165/104.14, 104.33, 185; 16/223, 303, 16/308, 321, 342, 367
    See application file for complete search history.

(56) References Cited

U.S. PATENT DOCUMENTS

| 5,796,581 | A  | * | 8/1998  | Mok ......................... 361/679.27 |
| 5,880,929 | A  | * | 3/1999  | Bhatia ...................... 361/679.27 |
| 6,141,216 | A  |   | 10/2000 | Holung |
| 6,377,452 | B1 |   | 4/2002  | Sasaki |
| 6,411,501 | B1 | * | 6/2002  | Cho et al. ................. 361/679.27 |
| 6,421,231 | B1 | * | 7/2002  | Jung ........................ 361/679.27 |
| 6,449,149 | B1 | * | 9/2002  | Ohashi et al. ............ 361/679.46 |
| 6,507,488 | B1 | * | 1/2003  | Cipolla et al. ........... 361/679.52 |
| 7,042,724 | B2 | * | 5/2006  | Löcker ......................... 361/699 |
| 7,400,497 | B2 | * | 7/2008  | Zhang et al. ............. 361/679.55 |
| 7,606,023 | B2 | * | 10/2009 | Konno et al. ............ 361/679.26 |
| 2004/0080908 | A1 | * | 4/2004 | Wang et al. .................. 361/687 |
| 2008/0259568 | A1 |   | 10/2008 | Takayanagi et al. |
| 2011/0292605 | A1 | * | 12/2011 | Chen et al. .................... 361/695 |
| 2012/0069549 | A1 | * | 3/2012  | Hsu et al. ..................... 362/97.1 |

FOREIGN PATENT DOCUMENTS

| CN | 101295085 A  | 10/2008 |
| JP | 2000031679   | 1/2000  |
| JP | 2000277963   | 10/2000 |
| JP | 2001005567   | 1/2001  |
| JP | 2001144485   | 5/2001  |
| JP | 2004164667   | 6/2004  |
| JP | 2007258193   | 10/2007 |
| TW | M270415      | 7/2005  |

\* cited by examiner

*Primary Examiner* — Michail V Datskovkiy
(74) *Attorney, Agent, or Firm* — Winston Hsu; Scott Margo (57) ABSTRACT

A heat-dissipation structure for a portable folding electronic apparatus includes a hinge support and a heat-conducting device. The portable folding electronic apparatus includes a first casing, a second casing, a hinge, a panel module, and the heat-dissipation structure. The first casing and the second casing are pivotally connected by the hinge. The panel module includes a frame and a light source disposed at a corner of the frame. The hinge support is connected to the hinge and the frame. The heat-conducting device is fixed on the hinge support near the light source. Therefore, heat produced by the light source can be dissipated through the heat-conducting device for improving the optical effect of the panel module; deformation of the heat-conducting device can be reduced by use of the stiffness of the hinge support.

14 Claims, 8 Drawing Sheets

HEAT-DISSIPATION STRUCTURE FOR A PORTABLE FOLDING ELECTRONIC APPARATUS

BACKGROUND OF THE INVENTION

1. Field of the Invention

The invention relates to a heat-dissipation structure, and especially relates to a heat-dissipation structure for heat dissipation of a light source inside a portable folding electronic apparatus.

2. Description of the Prior Art

As the light-emitting power of Light-Emitting Diode (LED) is improving, the quantity of LED used in a light source module of a liquid crystal panel is decreasing. However, power of a single high-power LED is so high that a local heat spot is induced easily. The local heat spot makes a film or a light-guiding plate warp to induce optical defects therein, Mura for example. The local heat spot also reduces the service life of the LED. Current heat-dissipation architecture is designed mostly for bar-shaped light sources. Heat produced per unit area at the light source is much less than that at the above-mentioned single high-power LED, so it is difficult to perform heat dissipation with the current heat-dissipation architecture on the light source module with only several high-power LEDs efficiently.

SUMMARY OF THE INVENTION

An objective of the invention is to provide a heat-dissipation structure for a portable folding electronic apparatus. The heat-dissipation structure utilizes a hinge structure in the portable folding electronic apparatus to fix a heat-conducting device so as to enhance heat dissipation of a light source.

The heat-dissipation structure of the invention is used in a portable folding electronic apparatus. The portable folding electronic apparatus includes a first casing, a second casing, a hinge connecting the first casing and the second casing, and a panel module disposed in the first casing. The panel module includes a frame and a light source disposed at a corner of the frame. The heat-dissipation structure includes a hinge support and a heat-conducting device. The hinge support is connected to the hinge and the frame. The heat-conducting device is mounted on the hinge support near the light source. Therefore, heat produced by the light source can be dissipated through the heat-conducting device for improving the optical effect of the panel module; deformation of the heat-conducting device can be reduced by use of the stiffness of the hinge support.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
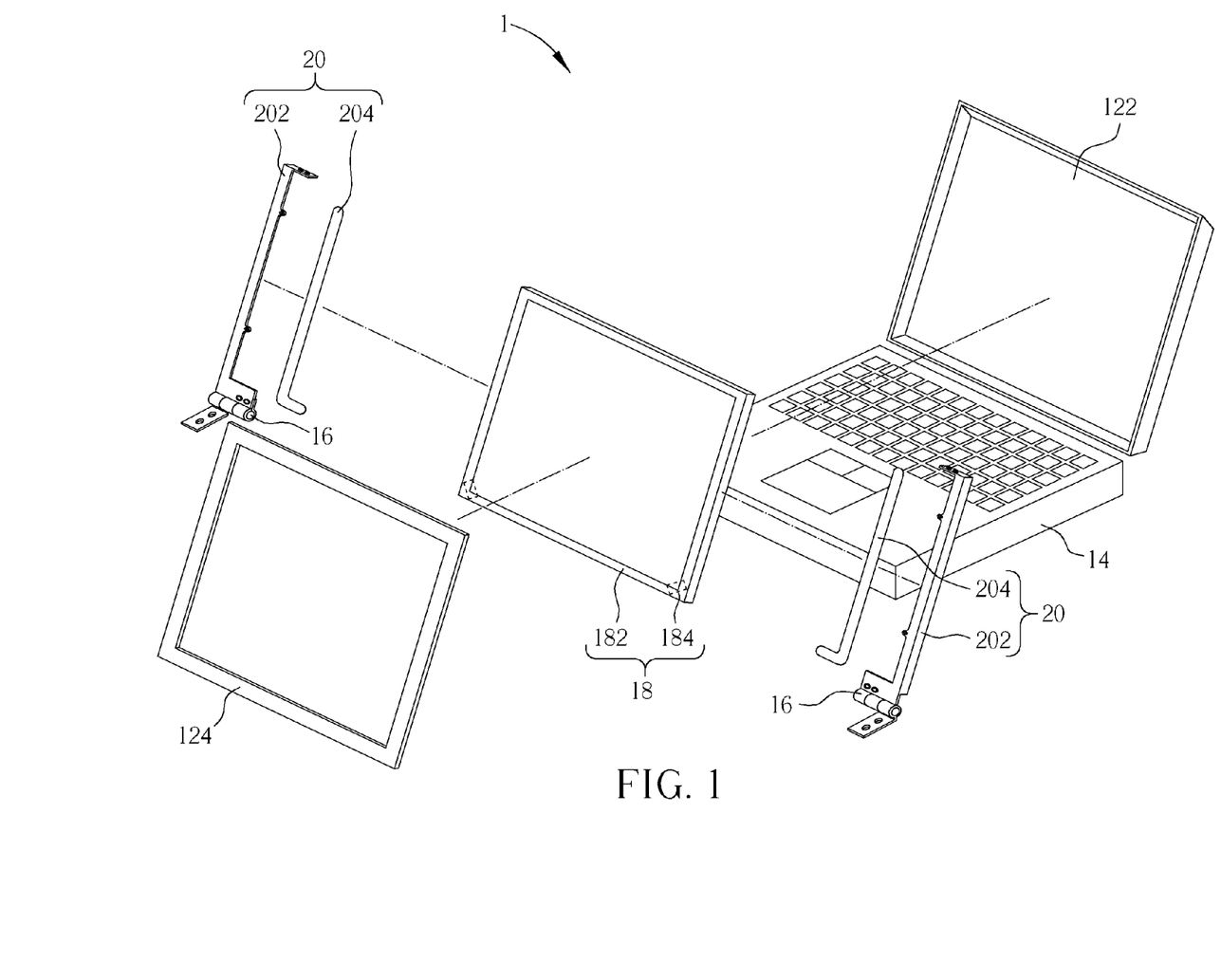
FIG. 1 is a schematic diagram illustrating an exploded view of a portable folding electronic apparatus of a preferred embodiment according to the present invention.
Figure 2:
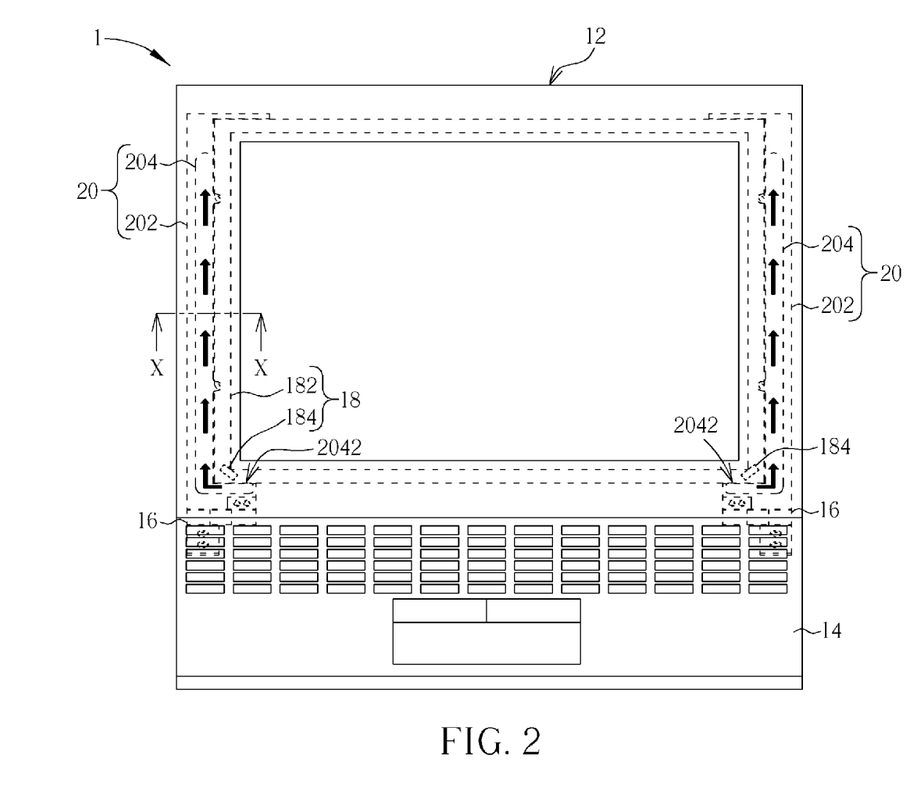
FIG. 2 is a schematic diagram illustrating a front view of the portable folding electronic apparatus.

Please refer to FIG. 1 and FIG. 2. FIG. 1 is a schematic diagram illustrating an exploded view of a portable folding electronic apparatus 1 of a preferred embodiment according to the present invention. FIG. 2 is a schematic diagram illustrating a front view of the portable folding electronic apparatus 1. In the embodiment, the portable folding electronic apparatus 1 is a notebook computer, but the invention is not limited to it.

The portable folding electronic apparatus 1 includes a first casing 12, a second casing 14, two hinges 16, a panel module 18, and two heat-dissipation structures 20; therein, in FIG. 2, the hinge 16, the panel module 18, and the heat-dissipation structure 20 are shown in dashed lines. The first casing 12 consists mainly of a back cover 122 and a front cover 124 engaged to each other. The panel module 18 is disposed in the first casing 12 and includes a frame 182 and two light sources 184 (the positions thereof are shown in dashed lines) disposed at corners of the frame 182. The light source 184 is a high-power LED for example, but the invention is not limited to it. The first casing 12 and the second casing 14 are pivotally connected by the hinge 16. In the embodiment, the hinges 16 and the heat-dissipation structures 20 are symmetrically disposed. The quantity of the heat-dissipation structures 20 depends on the quantity of the light sources 184; however, in practice, the invention is not limited to it. The heat-dissipation structure 20 includes a hinge support 202 and a heat-conducting device 204. The hinge support 202 is connected to the hinge 16 and the frame 182. The heat-conducting device 204 is attached on the hinge support 202 near the light source 184. In the embodiment, the heat-conducting device 204 is disposed between the hinge support 202 and the frame 182, but the invention is not limited to it.

Because the heat-conducting device 204 is disposed near the light source 184, heat produced in operation by the light source 184 can be dissipated through the heat-conducting device 204; therein, in FIG. 2, the heat flow is substantially shown by bold arrows. In the embodiment, the hinge support 202 is bar-shaped substantially. The heat-conducting device 204 is also bar-shaped. The extension direction of the heat-conducting device 204 is equivalent to the extension direction of the hinge support 202, so that the heat-conducting device 204 is disposed mostly on hinge support 202 directly. That is, the heat-conducting device 204 can be totally mounted on the hinge support 202; alternatively, most portion of the heat-conducting device 204 is mounted on the hinge support 202, and a small portion of the heat-conducting device 204 extends toward the light source 184 to protrude out of the hinge support 202. In practice, the heat-conducting device 204 is a heat pipe, but the invention is not limited to it. When the hinge support 202 is made of metal, the above-mentioned mounting way can be performed by soldering or adhering with heat-conductive adhesive to attach the heat-conducting device 204 on the hinge support 202. In this case, the hinge support 202 can have a higher stiffness to provide a better supporting for the heat-conducting device 204, so as to avoid the heat dissipation efficiency of the heat-conducting device 204 being affected by an unexpected deformation of the heat-conducting device 204; besides, the hinge support 202 of metal is conducive to the heat dissipation efficiency of the heat-conducting device 204 to the light source 184.

Figure 3:
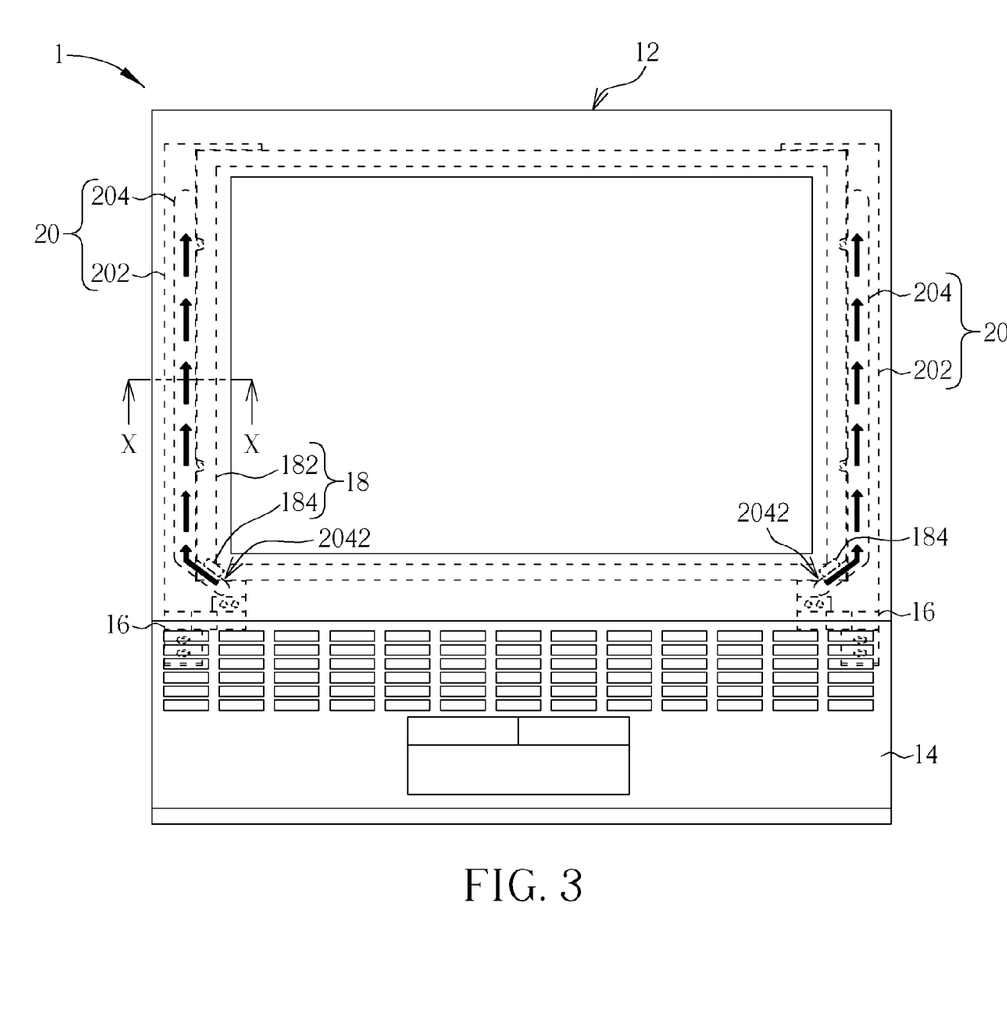
FIG. 3 is a schematic diagram illustrating a front view of the portable folding electronic apparatus with a different configuration for the end portion.

Furthermore, the heat-conducting device 204 include an end portion 2042 near the light source 184. In the embodiment, the end portion 2042 contacts the frame 182 so as to indirectly transfer heat produced in operation by the light source 184. In the embodiment, the heat-conducting device 204 is disposed mostly between the hinge support 202 and the frame 182 and contacts the frame 182. When the frame 182 is made of metal, it is conducive to the transfer of the heat produced by the light source 184 to the heat-conducting device 204 and also conducive to the transfer of the heat residing in the heat-conducting device 204. In addition, in order to enhance the heat dissipation efficiency of the light source 184, in practice, the backside of the light source 184 can be exposed out of the frame 182 such that the end portion 2042 is capable of contacting the light source 184 directly. Please refer to FIG. 3. FIG. 3 is a schematic diagram illustrating a front view of the portable folding electronic apparatus 1 with a different configuration for the end portion 2042. As shown in FIG. 3, the frame 182 is designed with a structure of broken hole or notch thereon where the light source 184 can be exposed out of the frame 182 or the end portion 2042 can stretch into to contact the backside of the light source 184.

Figure 4:
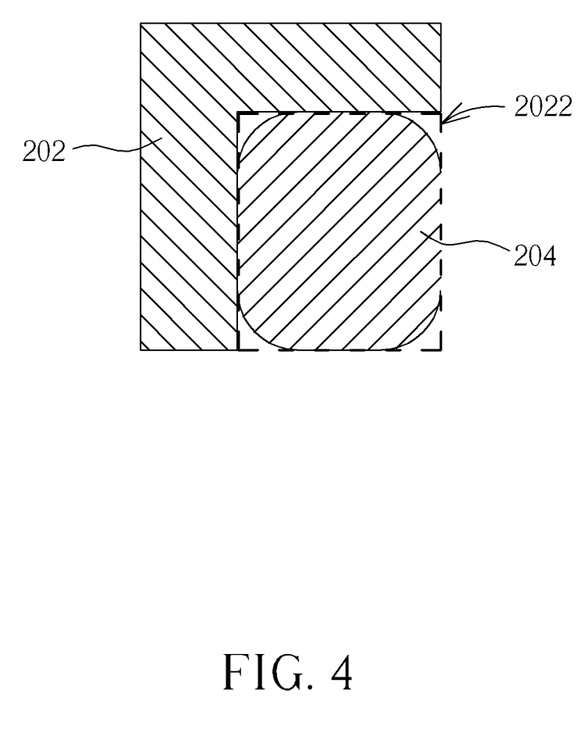
FIG. 4 is a schematic diagram illustrating a sectional view of the hinge support and the heat-conducting device according to an embodiment.
Figure 5:
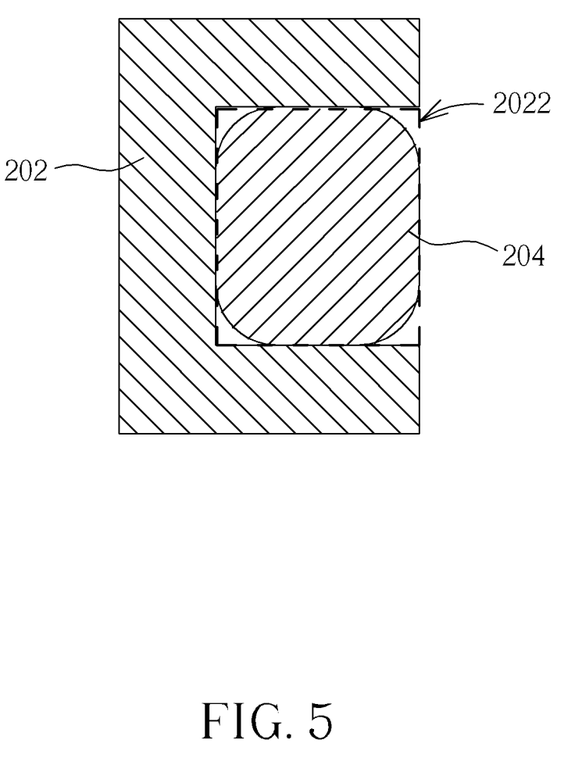
FIG. 5 is a schematic diagram illustrating a sectional view of the hinge support and the heat-conducting device according to another embodiment.
Figure 6:
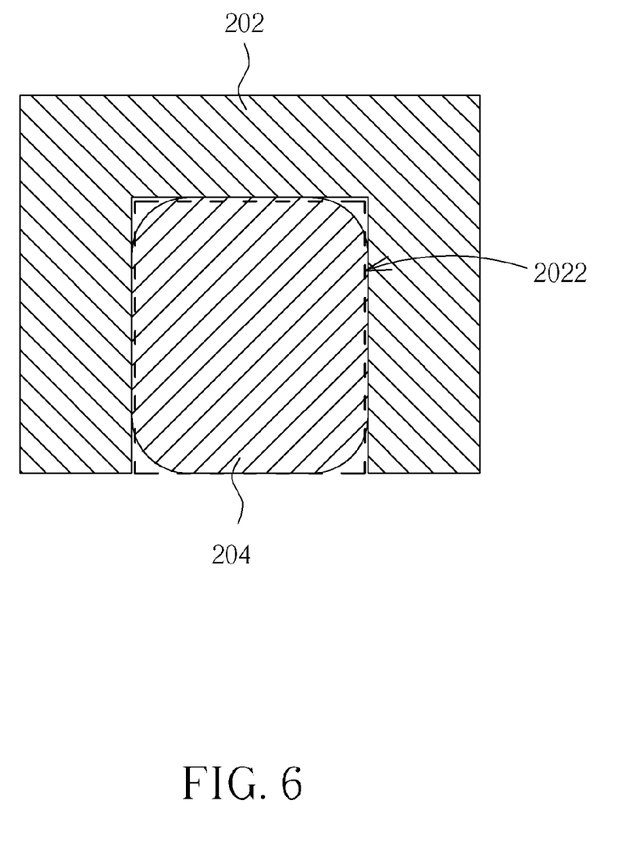
FIG. 6 is a schematic diagram illustrating a sectional view of the hinge support and the heat-conducting device according to another embodiment.

Please refer to FIGS. 4 through 6, which are schematic diagrams illustrating sectional views of the hinge support 202 and the heat-conducting device 204 according to different embodiments. Therein, the cross-section position is shown substantially as the line X-X in FIG. 2; the inner structure of the heat-conducting device 204 is not shown for simple reading. As mentioned above, the heat-conducting device 204 is mounted on the hinge support 202 by soldering or adhering with heat-conductive adhesive; besides, the hinge support 202 also provides a structural space for mounting the heat-conducting device 204. As shown in FIGS. 4 through 6, the hinge support 202 has a cross-section perpendicular to the extension direction of the hinge support 202 to be L-shaped, C-shaped, and n-shaped respectively to form an accommodating space 2022 where the heat-conducting device 204 is disposed. Furthermore, the hinge support 202 with L-shaped, C-shaped, and n-shaped cross-section can improve its stiffness and also enhance the structural protection of the heat-conducting device 204.

Figure 7:
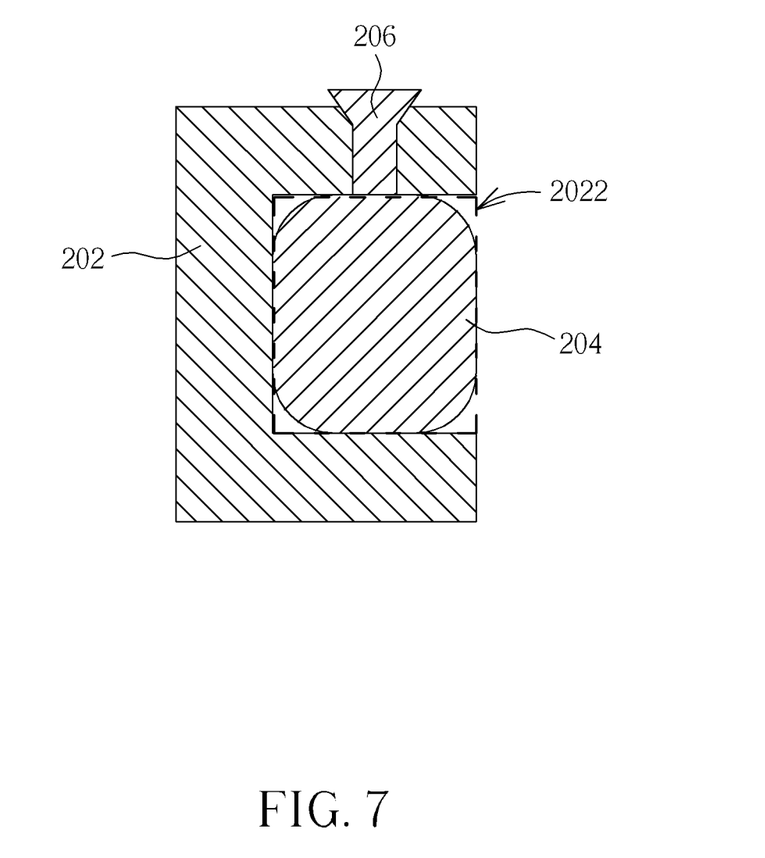
FIG. 7 is a schematic diagram illustrating a sectional view of the hinge support and the heat-conducting device for showing the mounting way thereof according to an embodiment.

It is added that the above-mentioned mounting way can be performed by soldering or adhering with heat-conductive adhesive to attach the heat-conducting device 204 on the hinge support 202, but the invention is not limited to it. For example, when the hinge support 202 is made of metal, the heat-conducting device 204 can also be mounted on the hinge support 202 by a screw attachment or an insert engagement. Please refer to FIG. 7 and FIG. 8, which are schematic diagrams illustrating sectional views of the hinge support 202 and the heat-conducting device 204 according to different embodiments, for illustrating different mounting ways of the hinge support 202 and the heat-conducting device 204; the inner structure of the heat-conducting device 204 is not shown for simple reading. As shown in FIG. 7, the heat-conducting device 204 can be mounted on the hinge support 202 by a screw engagement with screws 206. Because the screws 206 force heat-conducting device 204, the contact area between the heat-conducting device 204 and the hinge support 202 increases and the contact thereof is tighter. It reduces the thermal resistance therebetween to be conducive to thermal transfer.

Figure 8:
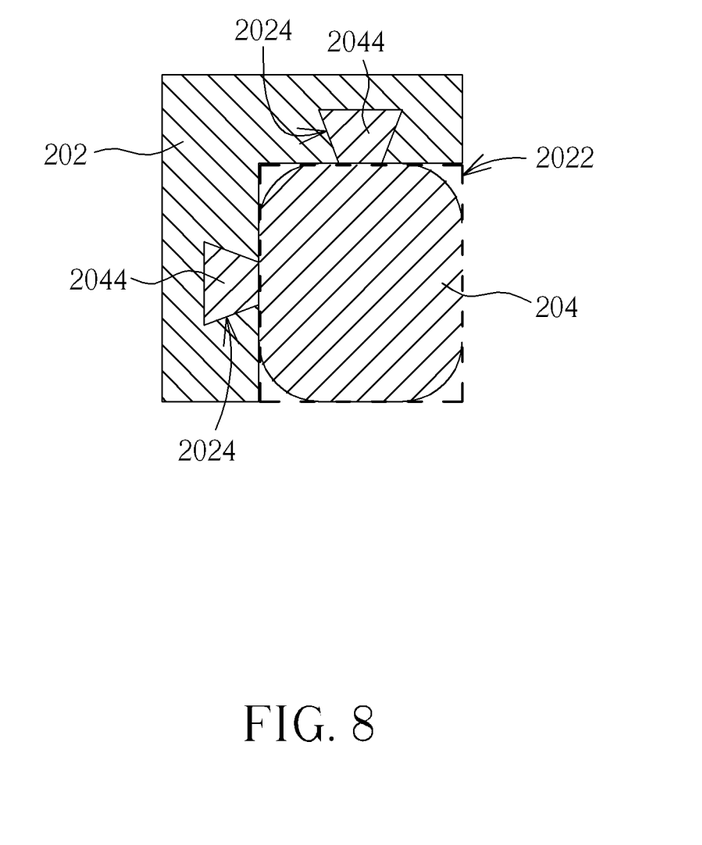
FIG. 8 is a schematic diagram illustrating a sectional view of the hinge support and the heat-conducting device for showing the mounting way thereof according to another embodiment.

Besides, as shown in FIG. 8, the hinge support 202 thereon forms grooves 2024; correspondingly, the heat-conducting device 204 are disposed with locking blocks 2044 thereon for being inserted into the grooves 2024. Therefore, the heat-conducting device 204 can be mounted on the hinge support 202 by the insert engagement. In practice, the locking blocks 2044 can be formed by the side walls of the heat-conducting device 204 (e.g. heat pipe) in the forming process of the heat-conducting device 204, or the locking blocks 2044 can be formed by additionally mounting the locking blocks 2044 on the heat-conducting device 204. Moreover, the grooves 2024 are not limited to extend through the whole hinge support 202; the grooves 2024 are not limited to dovetail grooves either. In practice, the insert structure between the heat-conducting device 204 and the hinge support 202 can be disposed at single side, not at two sides as shown in FIG. 8. Because the locking blocks 2044 are tightly connected to the heat-conducting device 204, and the locking blocks 2044 are also tightly inserted in the grooves 2024, the contact area between the heat-conducting device 204 and the hinge support 202 increases by the insert structure of the locking block 2044 and the groove 2024, which is conducive to the thermal resistance therebetween and also to thermal transfer. In addition, the above-mentioned screw and insert engagements are illustrated by the hinge supports 202 with C-shaped cross-section and L-shaped cross-section respectively; however, the invention is not limited to it. In practice, the above-mentioned screw and insert engagements certainly can be performed on the hinge supports 202 with C-shaped cross-section, L-shaped cross-section, and n-shaped cross-section respectively, which are not described additionally herein.

It is added more that, in order to enhance the heat transfer efficiency of the heat-conducting device 204 to the light source 184, the first casing 12 can have a metal portion; for example, the back cover 122 is made of metal for the metal portion. The hinge support 202 is connected to the back cover 122 so that the heat in the heat-conducting device 204 can be transferred to the back cover 122 for being dissipated. Furthermore, in the above embodiments, the bar-shaped heat-conducting device 204 is L-shaped, but the invention is not limited to it. The heat-conducting device 204 can be made to be C-shaped to increase the contact area of the heat-conducting device 204 with the frame 182, the hinge support 202, and even the metal back cover 122 and also to increase the heat dissipation area of the heat-conducting device 204. In addition, in the above embodiments, the heat-conducting device 204 is disposed between the hinge support 202 and the frame 182; the mounting connection of the hinge support 202 and the frame 182 can be performed based on a simple structure design of the hinge support 202, which can be easily realized by skilled people in the field and is not described in detail herein additionally.

As discussed above, the heat-dissipation structure 20 is generally disposed outside the panel module 18, so in practice, it is allowable only to modify the hinge support 202 so as to be applied to the monitor module of a current notebook computer. Furthermore, the original heat-dissipating module of the current notebook computer can continue used and operates together with the heat-dissipation structure of the invention, so that the light source, the light-guiding plate and so on can obtain good heat dissipation effect lest the panel module produces optical defects due to a poor uniformity of heat distribution. It also avoids that the light source is overheated leading to shorting the service life of the light source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An heat-dissipation structure for a portable folding electronic apparatus, the portable folding electronic apparatus comprising a first casing, a second casing, a hinge connecting the first casing and the second casing, and a panel module disposed in the first casing, the panel module comprising a frame and a light source disposed at a corner of the frame, the heat-dissipation structure comprising:
   a hinge support, connected to the hinge and the frame; and
   a heat-conducting device, mounted on the hinge support and near the light source.

2. The heat-dissipation structure of claim 1, wherein the heat-conducting device is bar-shaped.

3. The heat-dissipation structure of claim 2, wherein the heat-conducting device comprises an end portion near the light source.

4. The heat-dissipation structure of claim 3, wherein the light source is exposed out of the frame, and the end portion contacts the light source.

5. The heat-dissipation structure of claim 3, wherein the end portion contacts the frame.

6. The heat-dissipation structure of claim 2, wherein the hinge support is substantially bar-shaped, an extension direction of the heat-conducting device is equivalent to an extension direction of the hinge support, and the heat-conducting device is mounted mostly on the hinge support directly.

7. The heat-dissipation structure of claim 6, wherein the hinge support has a cross-section perpendicular to the extension direction of the hinge support, the cross-section is L-shaped, C-shaped, or n-shaped so that the hinge support forms an accommodating space, and the heat-conducting device is disposed in the accommodating space.

8. The heat-dissipation structure of claim 1, wherein the first casing has a metal portion, and the hinge support is connected to the metal portion such that heat in the heat-conducting device is capable of being transferred to the metal portion.

9. The heat-dissipation structure of claim 1, wherein the frame is made of metal, and the heat-conducting device is disposed between the hinge support and the frame and contacts the frame.

10. The heat-dissipation structure of claim 2, wherein the heat-conducting device is a heat pipe.

11. The heat-dissipation structure of claim 2, wherein the heat-conducting device is L-shaped or C-shaped.

12. The heat-dissipation structure of claim 1, wherein the hinge support is made of metal, and the heat-conducting device is attached to the hinge support by soldering or adhering with heat-conductive adhesive.

13. The heat-dissipation structure of claim 1, wherein the hinge support is made of metal, and the heat-conducting device is mounted on the hinge support by an insert engagement.

14. The heat-dissipation structure of claim 1, wherein the hinge support is made of metal, and the heat-conducting device is mounted on the hinge support by a screw attachment.

* * * * *